United States Patent
Kim et al.

(10) Patent No.: US 7,282,833 B2
(45) Date of Patent: Oct. 16, 2007

(54) STATOR ASSEMBLY OF DRUM MOTOR, AND HEAD DRUM ASSEMBLY OF MAGNETIC RECORDING/REPRODUCING APPARATUS

(75) Inventors: Myoung-Joon Kim, Suwon-si (KR); Chung-Hum Baik, Suwon-si (KR); Byeng-Bae Park, Ansan-si (KR); Jae-Hoon Sim, Suwon-si (KR); Seung-Woo Lee, Suwon-si (KR); Hyeong-Seok Choi, Suwon-si (KR); Jeong-Hyeob Oh, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 11/142,408

(22) Filed: Jun. 2, 2005

(65) Prior Publication Data

US 2006/0022548 A1 Feb. 2, 2006

(30) Foreign Application Priority Data

Jul. 29, 2004 (KR) .................. 10-2004-0059545

(51) Int. Cl.
*H02K 11/00* (2006.01)
*G11B 5/52* (2006.01)

(52) U.S. Cl. ............... 310/268; 310/68 R; 310/DIG. 6; 360/271.7

(58) Field of Classification Search .......... 310/DIG. 6, 310/268, 68 R; 360/271.1
See application file for complete search history.

(56) References Cited

U.S. PATENT DOCUMENTS

| | | | | |
|---|---|---|---|---|
| 4,594,524 A | * | 6/1986 | Sudo | ................. 310/68 R |
| 4,706,143 A | * | 11/1987 | Asada et al. | ............. 360/271.3 |
| 4,875,110 A | * | 10/1989 | Kazama et al. | ............... 360/64 |
| 4,902,923 A | * | 2/1990 | Okauchi | ..................... 310/268 |
| 5,023,734 A | | 6/1991 | Tamaki | |
| 5,519,270 A | * | 5/1996 | Yamada et al. | ........... 310/67 R |
| 5,637,945 A | * | 6/1997 | Yamamuro et al. | ......... 310/268 |
| 5,751,520 A | | 5/1998 | Kim | |
| 5,969,909 A | | 10/1999 | Cheong | |
| 6,369,991 B1 | | 4/2002 | Choi et al. | |
| 7,126,793 B2 | * | 10/2006 | Baik et al. | ............... 360/271.1 |
| 2003/0146672 A1 | * | 8/2003 | Fukushima et al. | ......... 310/268 |

FOREIGN PATENT DOCUMENTS

| | | |
|---|---|---|
| EP | 1 411 524 A | 4/2004 |
| JP | 06-057059 | 5/1994 |
| JP | 09-115102 | 5/1997 |
| JP | 10-162331 | 6/1998 |
| JP | 2003-308604 | 10/2003 |
| KR | 1995-6954 | 6/1995 |

* cited by examiner

*Primary Examiner*—Burton Mullins
(74) *Attorney, Agent, or Firm*—Roylance, Abrams, Berdo & Goodman, LLP

(57) ABSTRACT

A stator assembly of a motor for a head drum is provided to generate a driving force disposed opposite to a motor rotor. The stator motor includes a double sided flexible printed circuit (FPC). A signal line is formed in a pattern is formed on both sides of the flexible printed circuit (FPC) for inputting an electrical signal. A plurality of wound driving coils are connected to a first side of the flexible printed circuit (FPC) to electrically connect with the signal line. A yoke is connected to a second side of the flexible printed circuit (FPC).

14 Claims, 4 Drawing Sheets

STATOR ASSEMBLY OF DRUM MOTOR, AND HEAD DRUM ASSEMBLY OF MAGNETIC RECORDING/REPRODUCING APPARATUS

CROSS-REFERENCE TO RELATED APPLICATIONS

This application claims the benefit under 35 U.S.C. § 119(a) of Korean Patent Application No. 2004-59545, filed on Jul. 29, 2004, the entire disclosure of which is hereby incorporated by reference.

BACKGROUND OF THE INVENTION

1. Field of the Invention

The present invention relates to a head drum assembly for a magnetic recording/reproducing apparatus. More particularly, the present invention relates to a motor stator having a double sided flexible printed circuit (FPC).

2. Description of the Related Art

Generally, a magnetic recording/reproducing apparatus is utilized to record information on a recording medium such as a magnetic tape to reproduce recorded information. Video cassette tape recorders or camcorders are examples of magnetic recording/reproducing apparatuses.

Typically, magnetic recording/reproducing apparatuses include a deck, a head drum assembly rotatably installed on the deck to record/reproduce information on a magnetic tape, and a tape guide unit to guide the travel of the magnetic tape.

The head drum assembly is inclined at a predetermined angle to the deck. Angularly positioning the head drum assembly improves the function of the recording/reproducing apparatus. An example of a conventional head drum assembly is illustrated in FIG. 1.

Referring to FIG. 1, a fixed drum 11 is installed on a shaft 10. A rotary drum 12 is rotatably installed on the shaft 10 opposite to the fixed drum 11. A magnetic head 13 is supported in the rotary drum 12. The magnetic head records/reproduces information by scanning a traveling magnetic tape. A drum cover 14 is fixed to the shaft 10 in an upper part of the rotary drum 12. A rotary transfer 15 and a fixed transfer 16 convert a magnetic signal to an electrical signal for transfer. The rotary transfer 15 and fixed transfer 16 are respectively installed on the side of the rotary drum 12 which faces the drum cover 14.

A motor rotor 17 is installed on the rotary drum 12. A motor stator 18 is installed on the fixed drum 11 opposite to the motor rotor 17. The motor rotor 17 utilizes a magnet to generate a driving force for rotating the rotary drum 12 by a reciprocating relative to the motor stator 18.

A yoke 19 made of a metal material is installed in a lower part of the motor stator 18. The yoke 19 is fixed to the fixed drum 11 separately from the motor stator 18. The yoke 19 focuses magnetic power of the motor stator 18. Thus, the yoke 19 improves current characteristic for rotating the rotary drum 12.

The motor stator 18 is structured so that a fine pattern coil 18b is formed as one on a printed circuit board (PCB) 18a as shown in FIG. 2. That is, the motor stator 18 is provided with nine coils for driving a motor, which are formed in a pattern on PCB 18a. A phase generation coil (PGC) to control a location of the motor and a frequency generation coil (FGC) to control a speed of the motor are also formed in a pattern on the PCB 18a. The motor stator 18 in the above structure has a predetermined thickness and is installed in the fixed drum 11, separately from the yoke 19. A soldering port 18c is connected with another separate flexible printed circuit (FPC) by means of soldering. The soldering port 18c is provided on one side of the PCB substrate 18a.

However, in the conventional motor stator as described above, there are difficulties and disadvantages with the manufacturing process. Specifically, forming a plurality of coils in a pattern is relatively complicated and the manufacturing costs are high.

Another problem is that the assembly process is relatively complex because a separate flexible printed circuit (FPC) has to be connected to the soldering port 18c by soldering.

Accordingly, there is a need for a head drum assembly for a magnetic recording/reproducing apparatus having a motor stator which reduces manufacturing costs and simplifies the assembly process.

SUMMARY OF THE INVENTION

An aspect of the present invention is to solve at least the above problems and/or disadvantages and to provide at least the advantages described below. Accordingly, an aspect of the present invention is to provide an economical motor stator and head drum assembly for a magnetic recording/reproducing apparatus by adapting the motor stator assembly.

According to an aspect of the present invention, there is provided a motor stator assembly for a drum motor to generate a driving force. The motor stator assembly is located opposite to a motor rotor. The motor stator assembly includes a double sided flexible printed circuit (FPC) having a signal line configured to input an electrical signal to each side of the FPC. The signal line is formed in a pattern. A plurality of wound driving coils are connected to a first side of the flexible printed circuit (FPC) for electrically connecting with the signal line. A yoke is connected to a second side of the flexible printed circuit (FPC).

Preferably, the plurality of driving coils may be electrically connected with the signal line of the flexible printed circuit (FPC) by soldering.

Further, the yoke may be attached to the second side of the flexible printed circuit (FPC) by an adhesive.

The second side of the flexible printed circuit (FPC) may be provided with a FP coil to control a driving speed of the motor and a PG coil to control a phase of the motor.

The FP coil and the PG coil may be formed in a pattern on the second side of the flexible printed circuit (FPC), respectively.

The driving coil may be adhered to the first side of the flexible printed circuit (FPC) by an adhesive.

According to another aspect of the present invention, there is provided a head drum assembly including a fixed drum arranged on a shaft. A rotary drum is rotatably installed on the shaft opposite to the fixed drum. The rotary drum supports a magnetic head. A drum motor rotatably drives the rotary drum. The drum motor includes a rotor installed on the rotary drum and a stator assembly is installed on the fixed drum opposite to the rotor. The stator assembly includes a first side connected with a plurality of wound driving coils as wound and a second side connected with a yoke.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
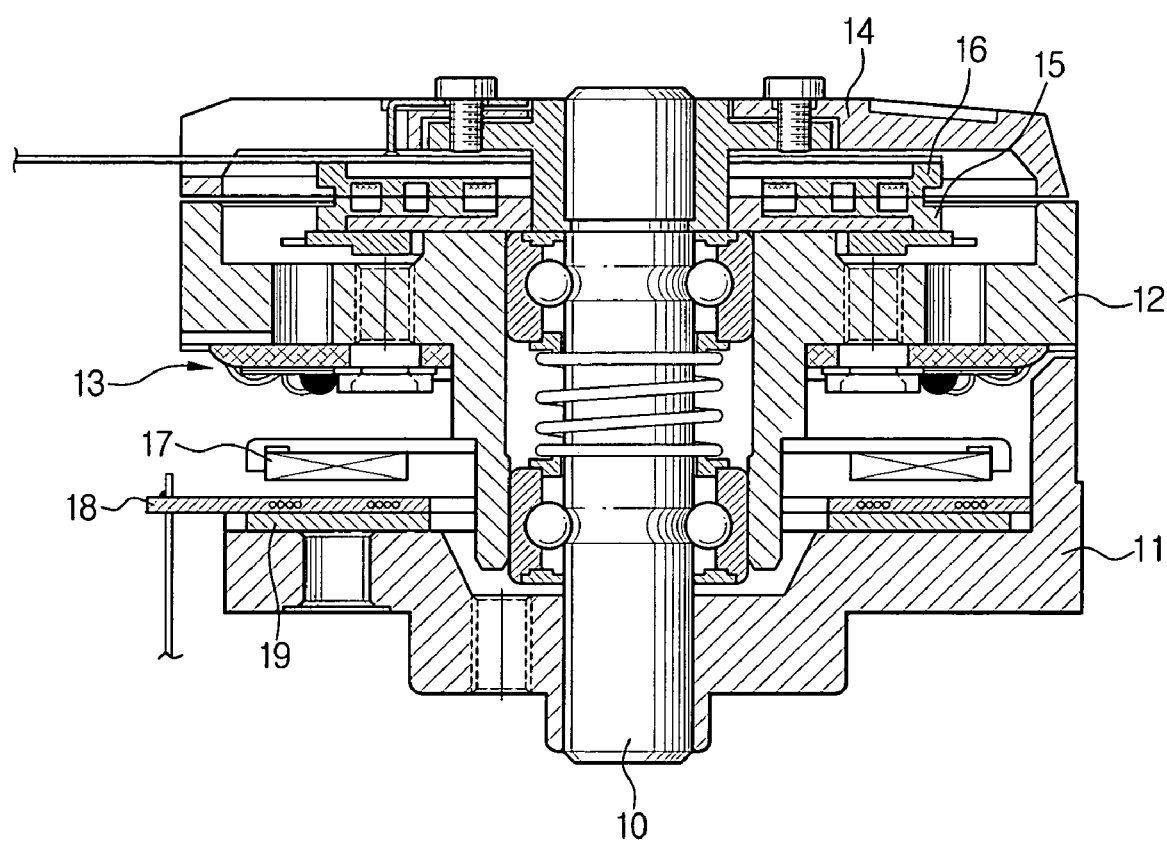
FIG. 1 is a sectional view illustrating a head drum assembly of a conventional magnetic recording/reproducing apparatus.
Figure 2:
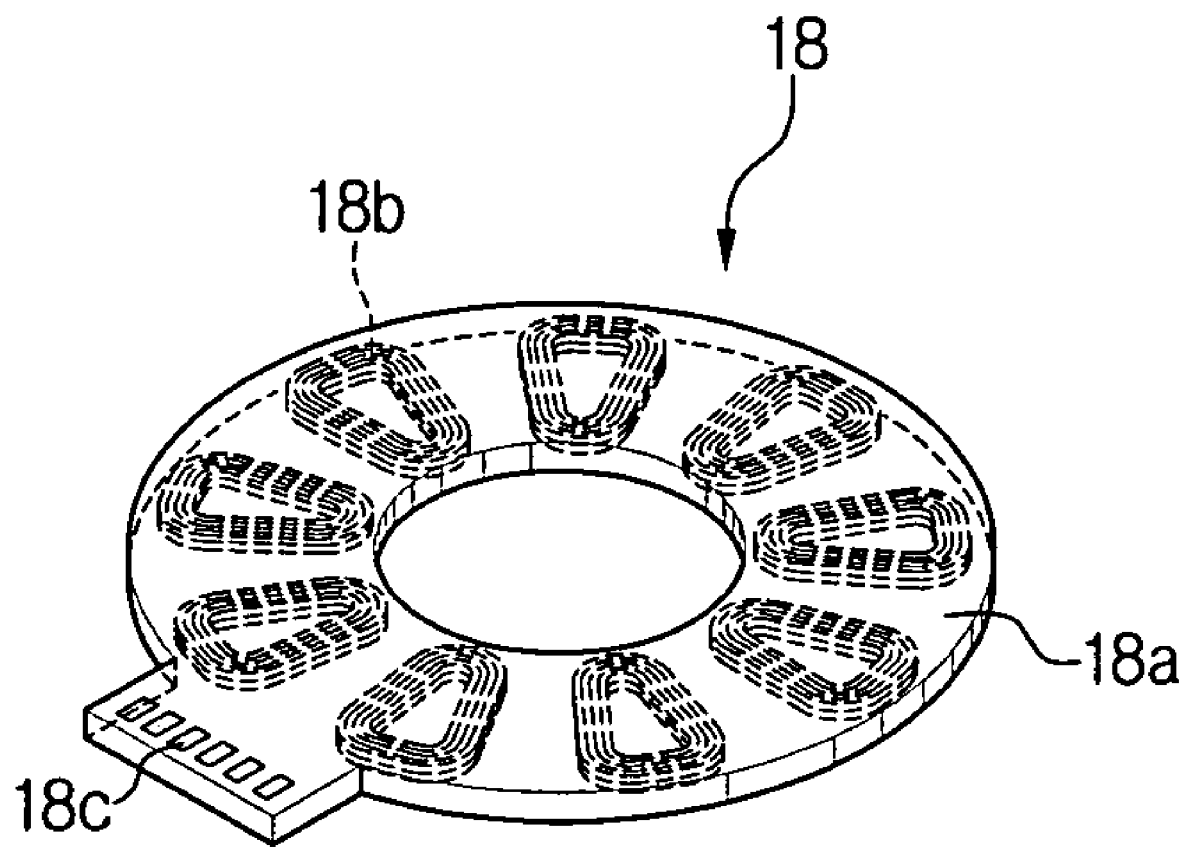
FIG. 2 is a perspective view illustrating a FP coil of FIG. 1.
Figure 3:
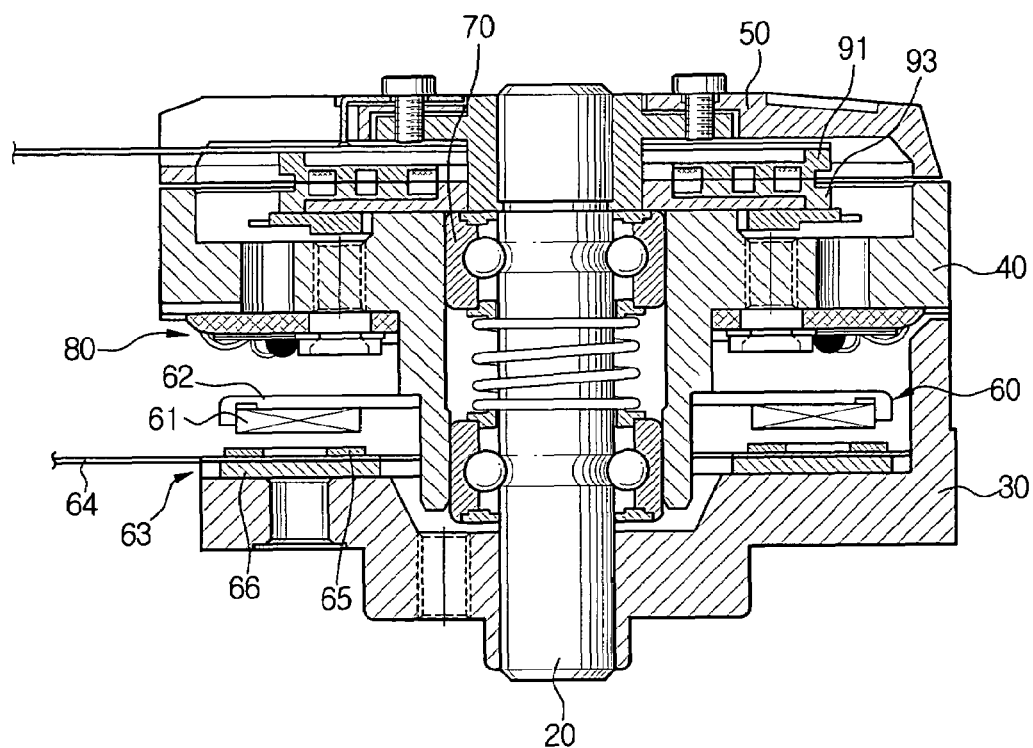
FIG. 3 is a sectional view illustrating a head drum assembly of a magnetic recording/reproducing apparatus in accordance with an embodiment of the present invention.

Referring to FIG. 3, a head drum assembly of a magnetic recording/reproducing apparatus in accordance with an embodiment of the present invention comprises a fixed drum 30 fixed to a shaft 20, a rotary drum 40 rotatably installed on an upper part of the fixed drum 30, a drum cover 50 installed on an upper part of the rotary drum 40, and a drum motor 60 to rotate the rotary drum 40.

The fixed drum 30 is fixedly inserted onto the shaft 20. The rotary drum 40 is connected to the shaft 20. A bearing 70 is installed between the rotary drum 40 and the shaft 20.

The rotary drum 40 supports a magnetic head 80. Magnetic head 80 records information onto a magnetic tape or reproduces recorded information by scanning a traveling magnetic tape.

The drum cover 50 is displaced on the rotary drum 40, and the shaft 20 is fixedly inserted on the drum cover 50. The drum cover 50 is provided with a fixed transfer 91, and the rotary drum 40 is provided with a rotary transfer 93, thereby transferring the information read by the magnetic head 80.

The drum motor 60 includes a rotor 61 installed on the rotary drum 40 and a stator assembly 63 installed on the fixed drum 30.

The rotor 61 is a substantially doughnut-shaped magnet. The rotor 61 is installed on the rotary drum 40 by a rotor case 62.

Figure 4:
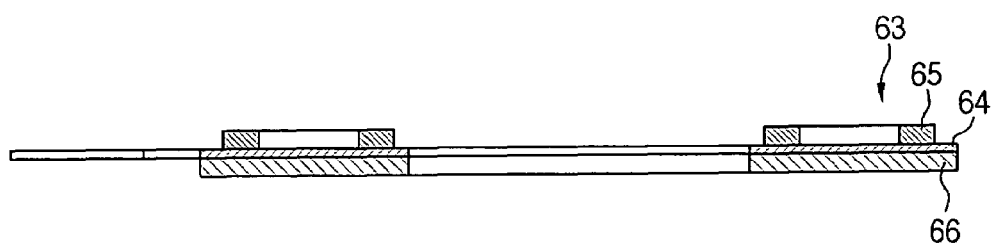
FIG. 4 is a sectional view illustrating a stator assembly extracted from FIG. 3.
Figure 5:
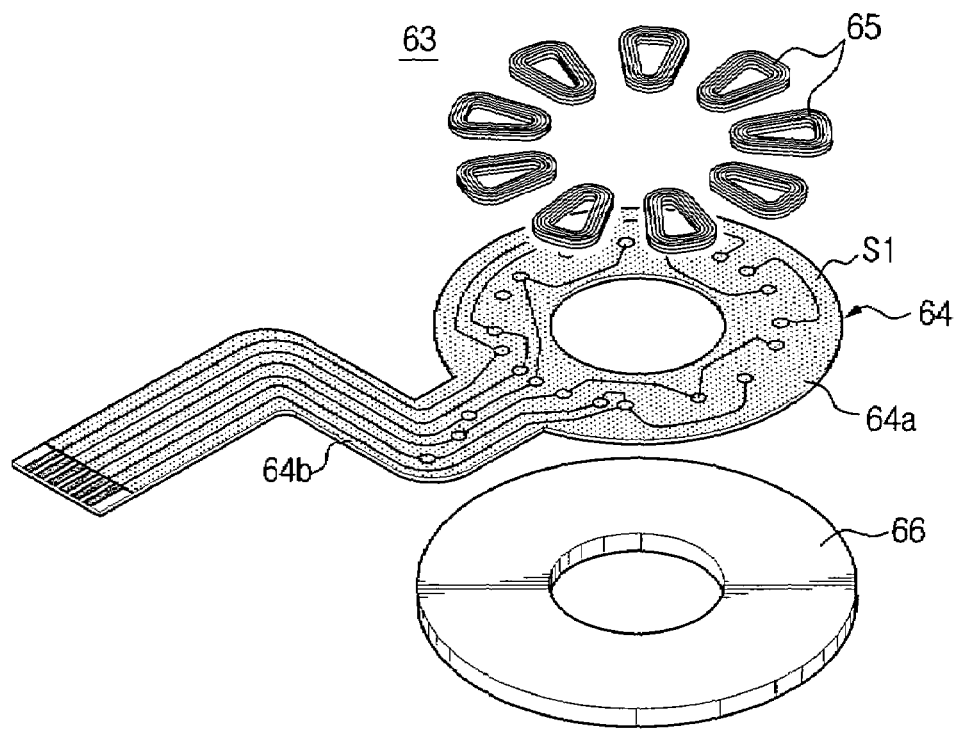
FIG. 5 is an exploded perspective view illustrating the stator assembly extracted from FIG. 3.

The stator assembly 63 is installed on the fixed drum 20 opposite to the rotor 61 at a predetermined distance. As shown in FIGS. 4 and 5, the stator assembly 63 is layered and has a flexible printed circuit (FPC) 64, a driving coil 65 and a yoke 66.

Specifically, the flexible printed circuit (FPC) 64 is double sided. The flexible printed circuit (FPC) has a predetermined signal line formed on each side to apply an electrical signal. The double sided flexible printed circuit (FPC) 64 includes a substantially doughnut-shaped stator unit 64a to which the driving coil 65 and the yoke 66 are connected. A signal line unit 64b extends from the stator unit 64a at a predetermined distance. On a first side of the double sided flexible printed circuit (FPC) 64, the driving coil 65 is installed by soldering for electrical connection with the signal lines. In the exemplary embodiment of the present invention, nine driving coils 65 are radially arranged on the stator unit 64a. The driving coil 65 is an ordinary coil wound in substantially oval shape and has a predetermined thickness.

Figure 6:
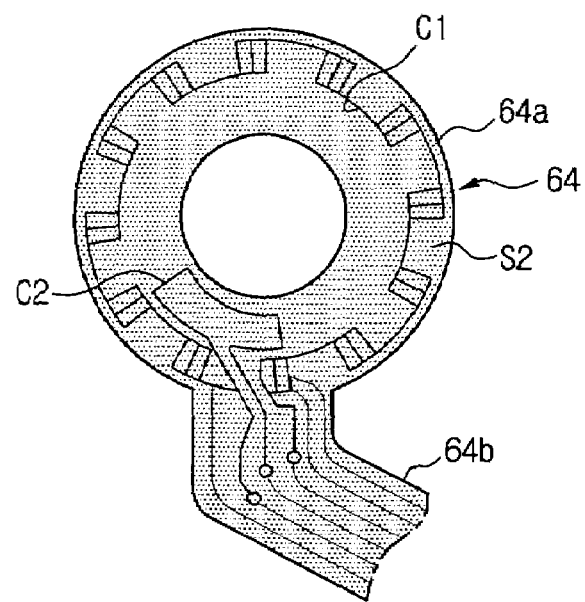
FIG. 6 is a bottom view illustrating a bottom of a flexible printed circuit (FPC) of FIG. 3.

Referring to FIG. 6, a second side (S2) of the double sided flexible printed circuit (FPC) 64 includes a FP coil (C1) and a PG coil (C2) formed in a pattern. The FP coil (C1) controls a driving speed of the drum motor 60. The PG coil (C2) controls phase, that is, a rotation location of the drum motor 60. The FP coil (C1) and the PG coil (C2) are connected with the signal line. The signal line is connected to the signal line unit 64b so that the electrical signal is input/output.

The yoke 66 is connected to the second side (S2) of the double sided flexible printed circuit (FPC) 64 by an adhesive. The yoke 66 is substantially doughnut shaped and corresponds to the stator unit 64a. The yoke is preferably made of a material such as metal.

As described in detail above, the stator assembly 60, the driving coil 65 and the yoke 66 are attached to both sides S1, S2 of the double sided flexible printed circuit (FPC) to form one unit. Likewise, the stator assembly 60 is assembled as one unit with the fixed drum 30. Therefore, it is possible to eliminate the relatively complicated step of assembling the stator on the yoke after fixing the yoke to the fixed drum as required in the conventional art.

According to the head drum assembly of the magnetic recording/reproducing apparatus of the exemplary embodiment of the present invention, it is possible to reduce the unit cost of production by forming the stator assembly of the drum motor as one body by attaching the driving coil and the yoke to the both sides of the flexible printed circuit (FPC).

Furthermore, the installing the stator assembly and the fixed drum as one body simplifies the assembly process.

While the invention has been shown and described with reference to certain embodiments thereof, it will be understood by those skilled in the art that various changes in form and details may be made therein without departing from the spirit and scope of the invention as defined by the appended claims.

What is claimed is:

1. A stator assembly of a motor for a head drum to generate a driving force and arranged opposite to a motor rotor, comprising:

a double sided flexible printed circuit (FPC) having a first side and a second side;

a plurality of wound driving coils connected to the first side of the flexible printed circuit (FPC), the plurality of wound driving coils being radially arranged on the first side of the flexible printed circuit;

an FP coil to control a driving speed of the motor and a PG coil to control a phase of the motor disposed on the second side of the flexible printed circuit; and a yoke connected to the second side of the flexible printed circuit.

2. The stator assembly as claimed in claim 1, wherein a signal line is formed in a pattern on the first side of the flexible printed circuit; and the plurality of driving coils are electrically connected with the signal line of the FPC by soldering.

3. The stator assembly as claimed claim 2, wherein the yoke is attached to the second side of the FPC by an adhesive.

4. The stator assembly as claimed in claim 1, wherein the FP coil and the PG coil are formed in a pattern on the second side of the FPC, respectively.

5. The stator assembly as claimed in claim 1, wherein the plurality of driving coils are adhered to the first side of the FPC by an adhesive.

6. The stator assembly as claimed in claim 1, wherein
the flexible printed circuit (FPC) has a signal line to input an electrical signal, the signal line being formed in a pattern and arranged on each side of the double sided flexible printed circuit (FPC), and
the plurality of wound driving coils are connected to the first side of the flexible printed circuit (FPC) and electrically connected with the signal line.

7. A head drum assembly of a magnetic recording/reproducing apparatus, comprising:
a fixed drum arranged on a shaft; and
a rotary drum rotatably installed on the shaft, the rotary drum being located opposite to the fixed drum to support a magnetic head; and
a drum motor to rotatably drive the rotary drum, wherein the drum motor includes a rotor and a stator assembly, the rotor being installed on the rotary drum, and the stator assembly being installed opposite to the rotor on the fixed drum, the stator assembly including a double sided flexible printed circuit (FPC) with a first side to which a plurality of wound driving coils are connected in a radial arrangement and a second side to which a yoke is connected, and an FP coil to control a driving speed of the motor and a PG coil to control a phase of the motor being disposed on the second side of the flexible printed circuit.

8. The head drum assembly as claimed in claim 7, wherein the driving coil is adhered to the first side of the flexible printed circuit (FPC) by an adhesive.

9. The head drum assembly as claimed in claim 7, wherein
the first side of the flexible printed circuit (FPC) has a signal line formed in a pattern and is connected with the driving coil by soldering.

10. The head drum assembly as claimed in claim 7, wherein
the second side of the flexible printed circuit (FPC) is provided with a FP coil to control a driving speed of the drum motor and a PG coil to control a phase of the motor.

11. The head drum assembly as claimed in claim 10, wherein
the FP coil and the PG coil are formed in a pattern on the second side of the flexible printed circuit (FPC).

12. The head drum assembly as claimed in claim 7, wherein
the yoke is attached to the second side of the flexible printed circuit (FPC) by an adhesive.

13. The head drum assembly as claimed in claim 7, wherein the flexible printed circuit (FPC) includes:
a substantially doughnut-shaped stator to support the driving coils, the driving coils having a substantially annular shape; and
a signal line unit extends from one side of the stator unit at a predetermined length, in which the signal line is formed in a pattern.

14. The head drum assembly as claimed in claim 7, wherein
the flexible printed circuit (FPC) has a signal line to input an electrical signal, the signal line being formed in a pattern and arranged on each side of the double sided flexible printed circuit (FPC), and
the plurality of wound driving coils are connected to the first side of the flexible printed circuit (FPC) and electrically connected with the signal line.

* * * * *